United States Patent [19]

Maeda

[11] Patent Number: 4,481,551
[45] Date of Patent: Nov. 6, 1984

[54] MAGNETIC RECORDING AND REPRODUCING APPARATUS

[75] Inventor: Masaya Maeda, Kanagawa, Japan

[73] Assignee: Canon Kabushiki Kaisha, Tokyo, Japan

[21] Appl. No.: 312,326

[22] Filed: Oct. 16, 1981

[30] Foreign Application Priority Data

Oct. 17, 1980 [JP] Japan ................................ 55-145282

[51] Int. Cl.³ ............................................. G11B 15/00
[52] U.S. Cl. ........................................ 360/85; 360/83; 360/84; 360/90; 360/93; 360/95; 360/96.1; 360/96.3
[58] Field of Search ....................... 360/83, 84, 85, 90, 360/93, 95, 96.1, 96.2, 96.3, 96.4

[56] References Cited

U.S. PATENT DOCUMENTS 2,717,282  9/1955  Reed ....................................... 360/90
3,719,364  3/1973  Hessland et al. .................... 360/96.4
3,925,819  12/1975  Bachmann ............................ 360/106

Primary Examiner—George G. Stellar
Attorney, Agent, or Firm—Toren, McGeady and Stanger

[57] ABSTRACT

In the magnetic recording and reproducing apparatus disclosed, a loading arrangement displaces magnetic tape between a position where the tape's running path from a tape supply member to a take up member relative to a recording and reproducing arrangement makes it possible to record and reproduce and a position where such recording and reproduction is disabled. A transfer friction arrangement between a tape drive and the supply member or the take up member changes its frictional operation depending upon the tape running path controlled by the loading arrangement. According to a specific embodiment disclosed, the drive is shiftable between a direct direct mode when the tape is disabled from recording or playback and a slip torque transmission mode when the recording-playback is enabled.

31 Claims, 7 Drawing Figures

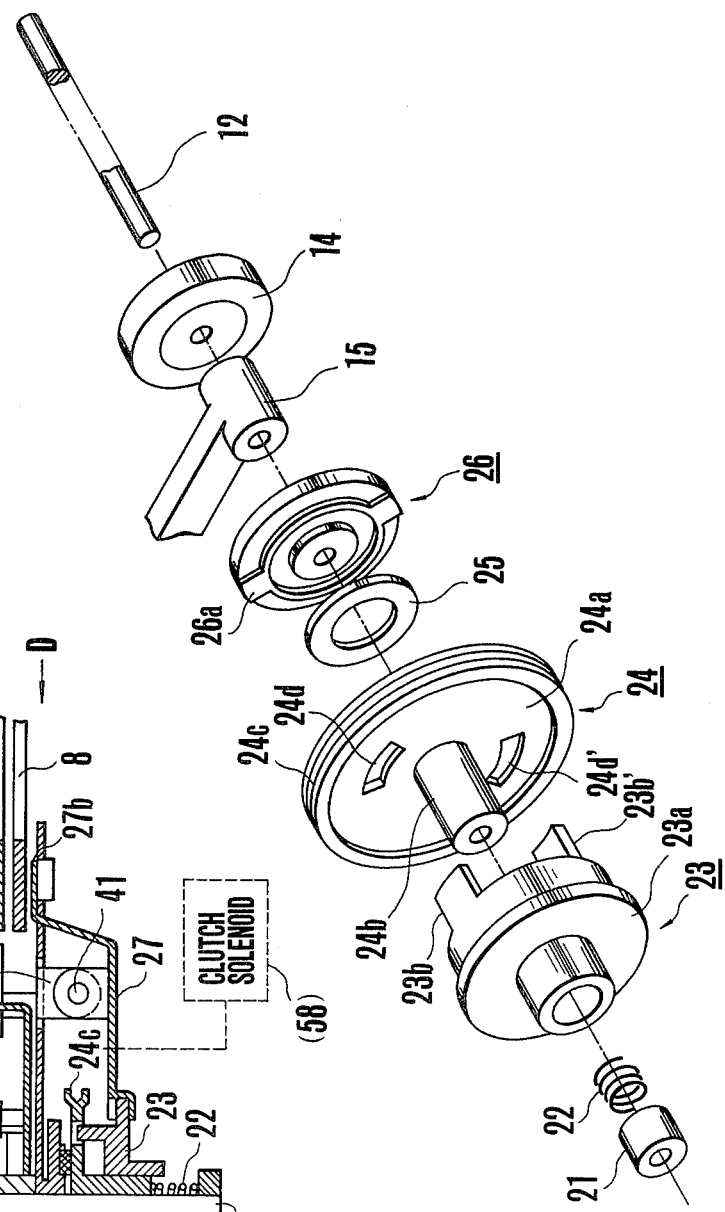

MAGNETIC RECORDING AND REPRODUCING APPARATUS

BACKGROUND OF THE INVENTION

1. Field of the Invention

This invention relates to a recording and reproducing apparatus with a high speed search function, and more particularly to improvements in its reel pedestal drive mechanism.

2. Description of the Prior Art

In magnetic recording and reproducing apparatuses with fast speed search functions, wherein tape engaging a recording-playback head is driven at high speed to reproduce images in a so-called "search", it is necessary to cope with the problem of regulating tape movement so that the tape may be wound at the high speed. The required torque transfer system for the tape supply and tape take up reel pedestals thus becomes very complex. For this reason, conventional types of such systems have utilized either separate electrically controlled motors for each reel pedestal, or complicated mechanical clutch mechanisms in order to accomplish the desired reel pedestal drive in each mode. The use of such systems therefore results in complex apparatuses which constitute one of the bottlenecks in attempts to minimize the bulk and size and weight of the system. Aside from requiring the actuating member for the ordinary fast feed and rewind, the actuation control portion also must have two actuating members adapted to operate only in the search mode for the forward and reverse feeds respectively. This increases the complexity of the actuation control portion and also calls for an increase in the space which the actuation control portion occupies. These problems become particularly serious when compactness, light weight, and good manageability are extremely important as in portable magnetic recording and reproducing apparatuses.

Generally, in the search mode, the recorder operates by rotating the capstan at a far higher speed then in the ordinary recording or reproducing mode. This causes the tape to run in the forward or reverse direction at this increased speed. The reel which takes up the tape, namely the take up reel when the tape runs in the forward direction, or the supply reel when the tape movement is reversed, must be driven through a slip-coupling of a prescribed appropriate transfer torque. The number of revolutions is adjusted to be slightly faster than the tape speed required in the search mode. On the other hand, in the ordinary rewind or fast feed mode, the supply reel or take up reel is coupled directly to the output of the motor. Since, in this case, the winding torque increases and the tape runs at a high speed, it is undesirable to permit the tape to remain in contact with the tape guide drum and other members such as the stationary head during that operation.

SUMMARY OF THE INVENTION

With the foregoing in mind, it is an object of the present invention to provide a magnetic recording and reproducing apparatus capable of search mode which is very simple in structure as compared with the conventional one.

Another object of the invention is to provide a magnetic recording and reproducing apparatus with the actuating member for the fast feed and fast rewind of the tape within the cassette being rendered possible to also serve as an actuating member for the search mode.

Still another object of the invention is to provide a magnetic recording and reproducing apparatus of simplified construction while still permitting an optimum winding torque to be obtained for a corresponding one of the various modes.

One of the features of the present invention is that the torque transferring means for transferring torque to the supply or takeup reel when in the fast rewind or fast wind mode is caused to change its operative position in response to loading of the tape so that with the tape loaded, when the actuating member for the fast rewind and fast wind mode is operated, the tape movement is regulated to suit the search mode.

That is, the present invention concerns a helical scan type magnetic recording and reproducing apparatus having the tape loading mechanism for bringing magnetic tape into contact around a tape guide drum over the predetermined angular distance in which drum is included a magnetic head and is to provide a magnetic recording and reproducing apparatus characterized in that an idler is provided to selectively engage a supply reel pedestal and takeup reel pedestal, and this idler is provided with driving torque transmitting means arranged to be switchable between a 1st operative position where driving torque of a drive source is transmitted directly to the idler, and a 2nd one where driving torque of the drive source is transmitted through a slip-coupling means to the idler, and that this switching is performed in relation to the operation of the aforesaid tape loading mechanism.

Such features enable a tape reel drive system for the search mode with the tape loaded and for the fast wind and fast rewind modes with the tape retracted within the cassette (unloaded) to be constructed in an extremely simple form and to operate with a high reliability, and a single actuating member to suffice for selection of these modes.

BRIEF DESCRIPTION OF THE DRAWINGS

FIG. 3 is a fragmentary sectional view taken along line A—A' of FIG. 2.

FIG. 4 is an exploded perspective view of the driving torque transferring mechanism.

DESCRIPTION OF THE PREFERRED EMBODIMENTS

The present invention will next be described in connection with an embodiment thereof by reference to the drawings.

Figure 1:
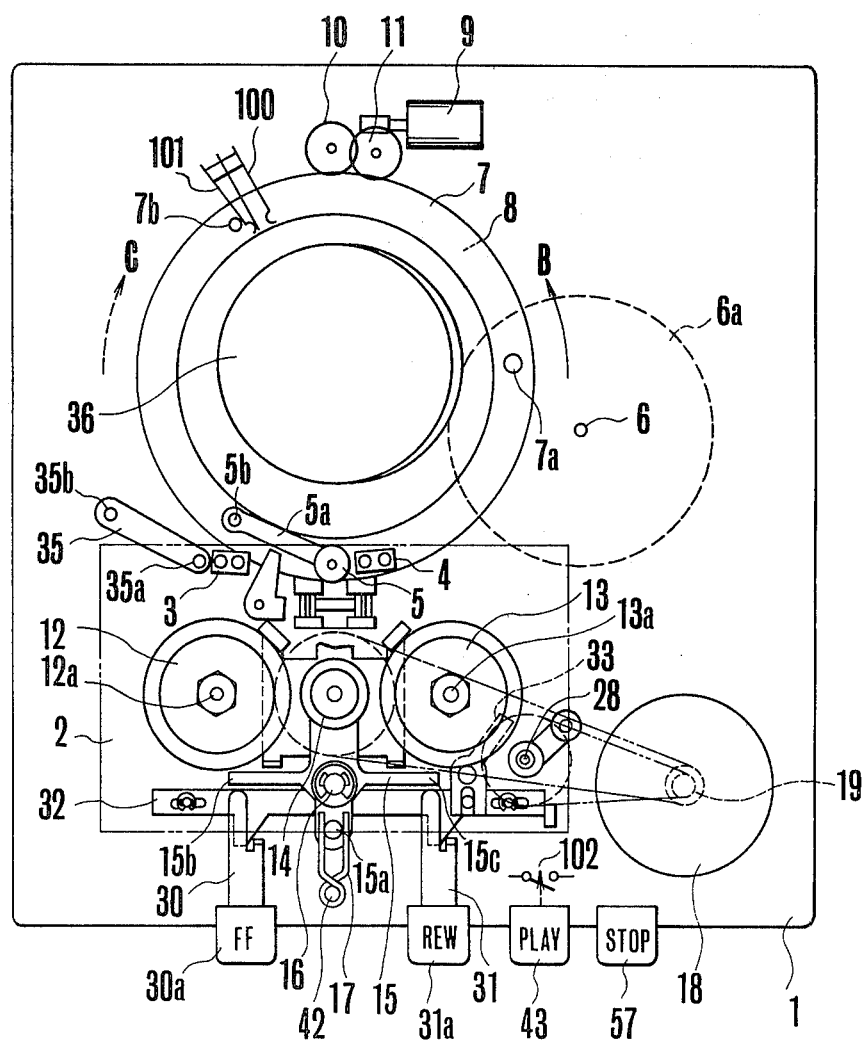
FIGS. 1 and 2 are plan views of an embodiment of a magnetic recording and reproducing apparatus according to the present invention in the loaded and unloaded positions respectively.
Figure 2:
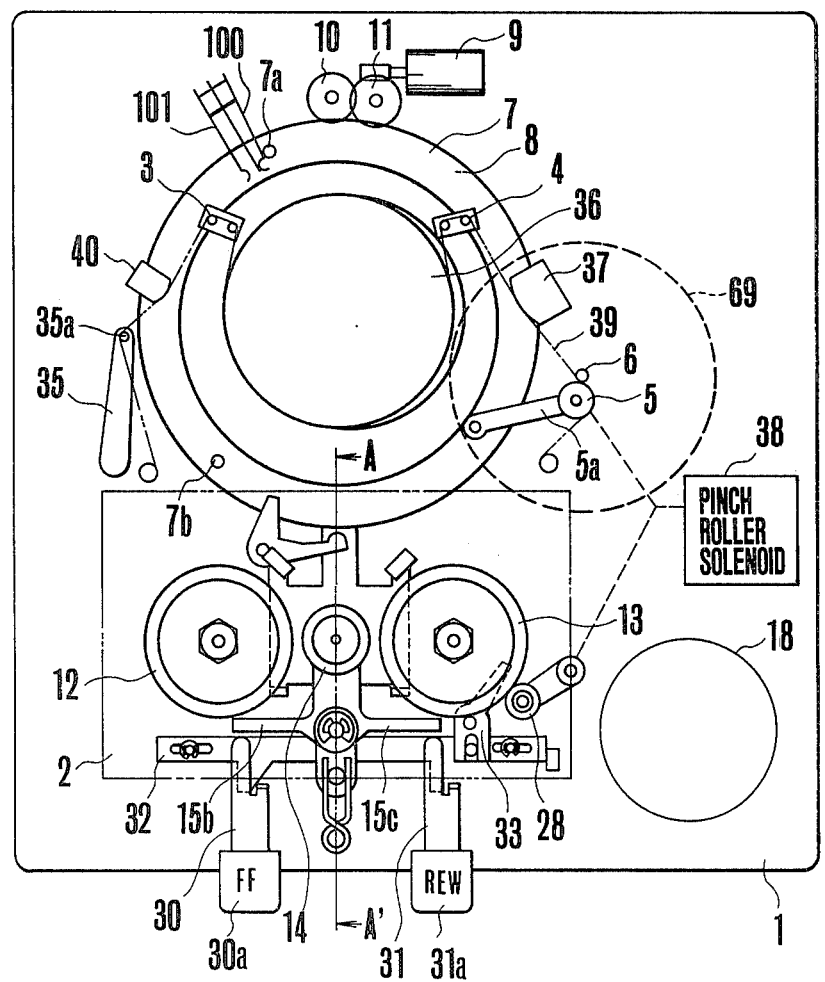
Figure 5:
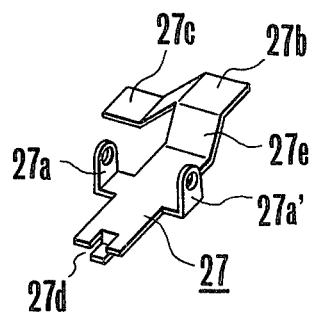
FIG. 5 is a perspective view of the clutch changeover plate.
Figure 6:
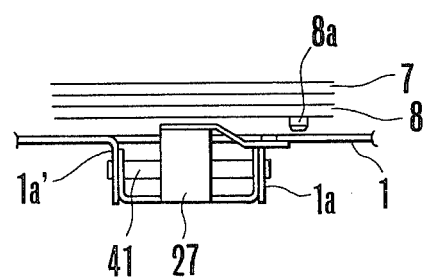
FIG. 6 is a side elevational view looking from a direction indicated by arrow D in FIG. 3.

FIGS. 1 and 2 illustrate a magnetic recording and reproducing apparatus employing one form of the invention with FIG. 1 showing an operative position before the tape loading and FIG. 2 an operative position after the completion of the tape loading. The tape loading method employed in this apparatus is substantially the so-called "M loading method." In FIG. 1, a tape The clutch changeover plate 27 functions to slide the aforesaid clutch disc 23 on the idler shaft 20 in vertical directions, and, as illustrated in FIG. 5, is provided with a pair of mount arms 27a and 27a'. These mount arms 27a and 27a' have respective penetration holes formed therein and, as shown in FIG. 6, these penetration holes and those in a pair of mount portions 1a and 1a' bent down in predetermined positions of the base plate 1 are penetrated by a common mount pin 41 so that the plate 27 is pivotally mounted on the lower surface of the base plate 1. One end portion of this clutch changeover plate 27 is bent off in part to a letter-L shape and forms a forked portion 27d appearing to be of a letter-U shape as viewed sidewards. This formed portion 27d slidably receives the flange 23a of the aforesaid clutch disc 24. The opposite end portion of the clutch changeover plate 27 is stepped up by a portion 27e toward the base plate 1 to form an actuating area 27b which takes a position beneath the aforesaid loading ring 8. One of the side portions of this actuating area 27b projects into a stopper portion 27c. The clutch changeover plate 27 is urged by a spring (not shown) in a counter clockwise direction as viewed in FIG. 3, and this rotation is limited by the aforesaid stopper portion 27c abutting on the base plate 1.

Formed in the lower portion of the aforesaid loading ring 8 at a position corresponding to the unloading completion is an actuating projection 8a as shown in FIG. 6. When the loading ring 8 is in the unloading position, this actuating projection 8a contacts and pushes the actuating area 27b of the clutch changeover plate 27. This turns the clutch changeover plate 27 in a clockwise direction as viewed in FIG. 3 against the bias force of the spring. Such clockwise movement of this clutch changeover plate 27 causes the clutch disc 23 to move upwards by virtue of the forked portion 27d engaging the flange 23a. As a result the extensions 23b and 23b' freely fitted in the penetration holes 24d and 24d' of the dirve pulley 24 engage the engagement projections 26a formed in the intermediate ring 26, and the driving torque of the drive pulley 24 from the capstan motor 18 is directly transmitted to the intermediate ring 26.

The idler table 15 is rotatably supported on a shaft 16 mounted on the base plate 1 and is urged to the central position between the two reel tables 12 and 13 by a spring 17 affixed to a pin 42 mounted on the base plate 1 and sandwiching a projecting portion 15a formed in the idler table 15 in sandwiching manner, table 15 includes a pair of armed portions 15b and 15c symmetric to each other with respect to the shaft 16, and these armed portions 15b and 15c are arranged in opposition to a fast feed control member 30 and a fast rewind control member 31 which are slidably moved by pushing a fast feed button 30a and a fast rewind button 31a respectively. Therefore, a pushing operation of the fast forward button 30a, acts on the aforesaid armed portion 15b which in turn causes the idler table to turn in a clockwise direction until the idler 14 engages the takeup reel table 13. Likewise, depressing the fast rewind button 31a, acts on the aforesaid armed portion 15b which in turn causes the idler table to turn in a counter-clockwise direction until the idler 14 engages the supply reel table 12.

It is noted that in FIG. 1, a slide plate 32, upon actuation of the fast feed control member 30 and fast rewind control member 31 moves to the left as viewed in the figure. Such leftward movement of this slide plate 32 cases an actuating lever 33 with its one end engaged therewith to turn in a clockwise direction, while the opposite end is displaced to move the aforesaid takeup idler 28 away from the takeup reel table 13. Also actuation of the aforesaid fast feed control member 30 and fast rewind control member 31 turns on switches 103 and 104 illustrated in FIG. 7.

Figure 7:
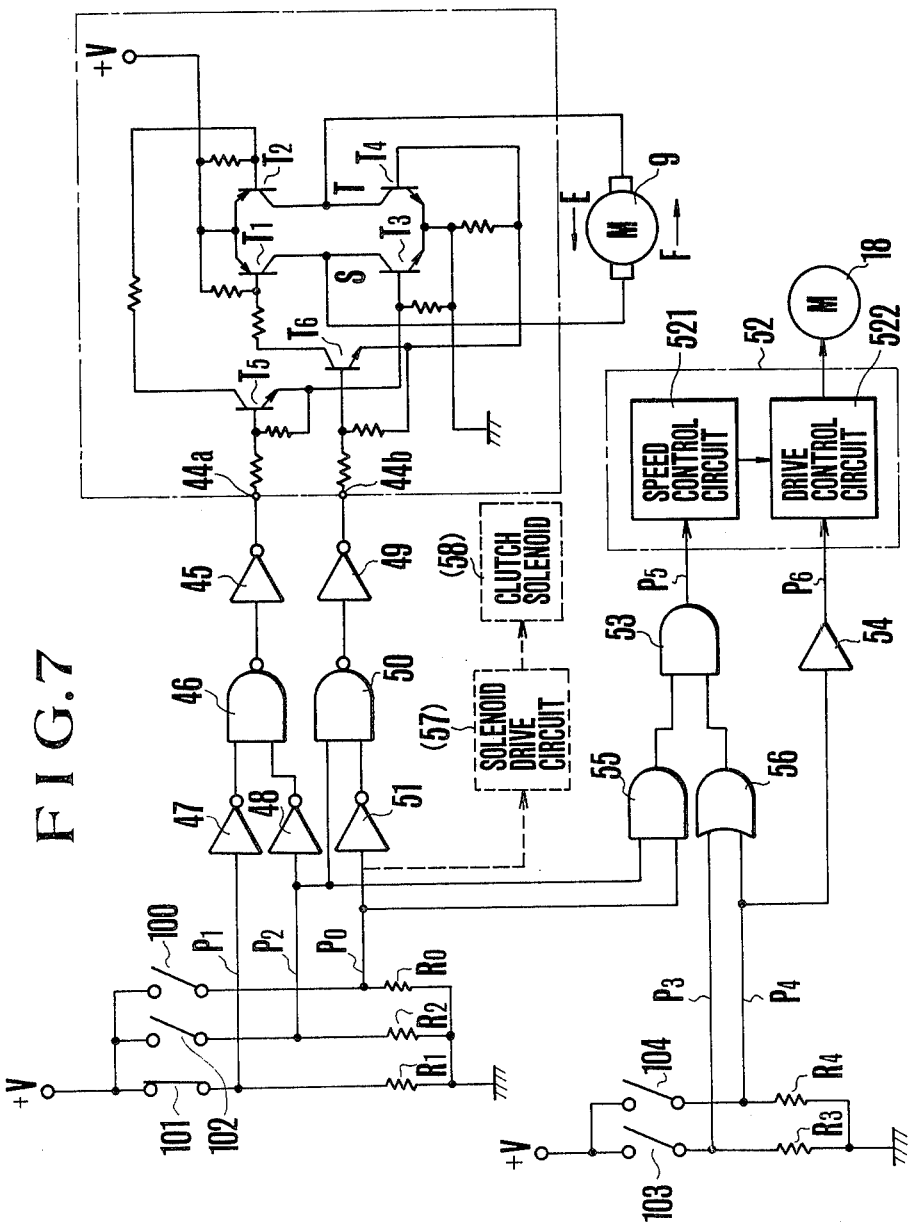
FIG. 7 is a schematic diagram of the drive circuit of the loading motor and capstan motor.

FIG. 7 illustrates a drive circuit for the loading motor 9 and capstan motor 18 in a position where unloading is completed. The drawing includes the loading completion detecting switch 100; the aforesaid unloading completion detecting switch; 101; a switch 102 arranged to turn on when a play button 43 illustrated in FIG. 1 is depressed; a switch 103 arranged to turn on when the fast feed button 30a is depressed; and a switch 104 arranged to turn on when the fast rewind button 31a is depressed. These switches 100 to 104 are formed as normally open microswitches, each of which is turned on (that is, conducting) when actuated, and off (that is, non-conducting) when de-actuated. And, the aforesaid switches 100 to 104 are connected to one terminal thereof to a positive voltage source V and at the other terminals to the circuit earth or ground through respective resistors R0 to R4, and produce outputs P0 to P4 at those of the terminals which are connected to the resistors R0 to R4 respectively. Therefore, these outputs P0 to P4 assume high level when the corresponding switches 100 to 104 are actuated, or closed, and low levels when de-actuated or opened.

The loading motor 9 and capstan motor 18 are direct current motors. Drive of the loading motor 9 is controlled by a circuit 44. This drive control circuit 44 has control terminals 44a and 44b. And, when a control signal supplied to the first control terminal 44a is of high level, and a control signal supplied to the second control terminal 44b is of low level, a drive current is allowed to flow through the loading motor 9 in a direction indicated by arrow E. When the control signal supplied to the control terminal 44a is of low level, and the control signal supplied to the control terminal 44b is of high level, a drive current is allowed to flow through the motor 9 in a direction indicated by arrow F. In more detail, the aforesaid drive control circuit 44 is constructed, for example, as shown in the figure, with a pair of PNP transistors T1 and T2 with their emitters connected to each other, and a pair of NPN transistors T3 and T4 with their emitters connected to each other, these pairs constituting a bridge circuit having a junction point S of the transistors T1 and T3 and a junction point T of the transistors T2 and T4 between which is connected the winding of the motor 9. Then, these transistors T1 to T4 are switched by a pair of NPN transistors T5 and T6. That is, the base of the transistor T5 is connected through a resistor to the aforesaid control terminal 44a so that when this transistor T5 is ON, the aforesaid transistors T2 and T3 are rendered conductive. Also the base of the transistor T6 is connected through a resistor to the aforesaid control terminal 44b so that when this transistor T6 is ON, the aforesaid transistors T1 and T4 are rendered conductive. Such motor drive circuit is known to those skilled in the art, and no further explanation is given here.

The aforesaid control terminal 44a is supplied through the inverter 45 with an output of a NAND circuit 46 which is supplied with the outputs P1 and P2 of the switches 101 and 102 through inverters 47 and 48 respectively. The control terminal 44b is supplied through an inverter 49 with an output of an NAND circuit 50 which is supplied with the output P2 of the switch 102 and through an inverter 51 with the output P0 of the switch 100. A drive circuit 52 for the capstan motor 18 includes a speed control circuit 521 and a drive control circuit 522. The speed control circuit 521 functions dependently of the control signal to set the number of revolution of the capstan motor 18 to either a first value N1 for the capstan 6 running the tape 39 at the ordinary speed, or a second value N2 for the capstan 6 running the tape 39 at the increased speed in the search mode. The control signal is supplied by the output P5 of an AND circuit 53. The output P5 of AND circuit 53, when low, sets the number of revolutions of the capstan motor 18 to the first value N1, and when high, sets it to the second value N2. The drive control circuit 522 functions dependently of the supplied control signal to control the direction of rotation of the capstan motor in such a manner that the capstan 6 drives the tape to move either in the ordinary running direction (hereinafter called "forward direction"), or in the opposite direction thereto (hereinafter called "reversed direction"). A control signal therefor is supplied by the output P6 of an amplifier 54. And, when the output P6 of the amplifier 54 is of low level, the capstan motor is rotated in the forward direction, and when of high level, it is driven in the reverse direction. Such drive control circuit 522 can readily be constructed as, for example, being similar to the aforesaid loading motor 9 drive control circuit 44 and comprising a bridge circuit of four transistors of which the switching is controlled depending upon the control signal. Therefore, its details are not further explained. Also the aforesaid speed control circuit 521 can readily be constructed as, for example, in such form that the intensity of current flowing through the capstan motor 18 is changed depending upon the control signal. Particularly where the aforesaid drive control circuit 522 is constructed with the use of the four-transistorized bridge circuit as has been mentioned above, the voltage of the electrical power source may be changed in magnitude depending upon the control signal P5. Therefore, its details are not further described.

The AND circuit 53 is supplied through an AND circuit 55 with the AND output of the outputs P0 and P2 of the switches 100 and 102, and through an OR circuit 56 with the OR output of the outputs P3 and P4 of the switches 103 and 104, and the aforesaid amplifier 54 is supplied with the output P4 of the switch 104.

According to an embodiment of the invention, a solenoid drive circuit 57 drives a clutch solenoid 58. To actuate the aforesaid clutch changeover plate 27, instead of using the actuating projection 8a formed in the lower surface of the loading ring 8, use is made of the clutch solenoid 58. Applied to the aforesaid solenoid drive circuit 57 as a control signal is the output P0 of the switch 100. And this drive circuit 57 operates such that when the output P0 of the switch 100 is high, the clutch solenoid 58 is driven.

According to another embodiment of the invention, the circuits 57 and 58 are omitted and the actuating projection 8a formed on the lower surface of the loading ring 8 actuates the clutch changeover plate 27.

Also, in FIG. 7, though not particularly shown, an additional circuit responsive to depression of any one of the play button 43, fast forward button 30a and fast rewind button 31a supplies drive voltage to the drive circuit 52 for the capstan motor 18. The capstan motor is then driven with the selection of the speeds and directions depending upon the control signals P5 and P6.

The operation of the apparatus of such construction is as follows: where the tape is unloaded as shown in FIG. 1, the aforesaid clutch changeover plate 27 is in the pushed position with its actuating area 27b engaging the actuating projection 8a formed in the bottom surface of the loading ring 8. Therefore, the clutch changeover plate 27 assumes the most clockwise position illustrated in FIG. 3 against the bias force of a spring (not shown). Therefore, the clutch disc 23 whose flange 23a is clamped by the forked portion 27d of the clutch changeover plate 27 is held in the raised position where the extensions 23b and 23b' of the clutch disc 23 pass through the respective freely fitted holes 24d and 24d' to engage the lugs 26a of the intermediate ring 26. That is, in the tape-unloaded position, the driving torque of the motor 18 is connected directly to the idler 14 by means of the drive pulley, clutch disc 23 and intermediate ring 26. Therefore, with this drive system, when the fast foward or fast rewind button 30a or 31a is pushed to press the idler 14 against the tapeup reel tape 13 or supply reel table 12, the tape runs at the high speed within the cassette 2 under the direct driving action of the motor 18.

To switch the aforesaid apparatus to the reproducing mode, the operator needs to push the PLAY button 43. When the PLAY button 43 is pushed it is locked in the pushed position by a lock mechanism (not shown), and the switch 102 is held ON so its output P2 is changed from low to high. Since, at this time, the loading completion detecting switch 100 is OFF with its output P0 low, the inputs of the NAND circuit 50 are all high, causing the output of the NAND circuit 50 to change to low. As a result, a signal of high level is applied to the control terminal 44b of the drive control circuit 44 for the loading motor 9. In this case, the other control terminal 44a is supplied with a signal of low level, since the output P2 of the switch 102 is of high level and therefore one of the inputs of the NAND circuit 46 is low which causes an output of high level. Therefore, the motor 9 is energized by current flowing in F direction from the drive control circuit 44 and starts to rotate. As a result, the aforesaid loading ring 7 is driven through the gear 11 to turn in the direction B in FIG. 1, while the aforesaid loading ring 8 is driven through the gears 10 and 11 to turn in the direction C in FIG. 1. As the rings 7 and 8 turns in the opposite directions to each other, the tape pull out members 4 and 3 while exerting pull on the tape 39 are moved in the predetermined paths and start to train the tape over the wall of the tape guide drum 36.

At the same time, the aforesaid unloading completion detecting switch 101 is released from its depressed state by the actuating projection 7b formed on the loading ring 7 so its output P1 is changed from high to low level. Then, when the loading rings 7 and 8 have turned the predetermined angular distance to complete the loading of the tape 39, the actuating projection 7a on the loading ring 7 closes the loading completion detecting switch 100 so its output P0 is changed from low to high level. Therefore, one of the inputs of the NAND circuit 50 becomes low level, so that the output of the NAND circuit 50 changes from low to high level. As a result, a signal of low level is applied to the control terminal 44b of the drive control circuit 44. Since, at this time, the output P2 of the switch 102 is of high level, as has been mentioned above, the signal of low level appears on the control terminal 44a. Therefore, the drive control circuit 44 stops the loading motor 9 from further rotation. As a result, rotation of the loading rings 7 and 8 stops.

As the aforesaid loading of the tape 39 is completed, the pinch roller 5 is brought into pressing contact against the capstan by means (not shown) and the tape 39 starts to run at the ordinary speed in the reproducing mode. In synchronism with the reach of the pinch roller 5 to the capstan 6, the takeup idler 28 is caused by a drive mechanism (not shown) to contact the takeup reel table 13. Then, the takeup reel table 13 is rotated and its reel starts to wind the tape 39. It is in this state that the electrical signals recorded on the tape 39 are read out by the rotary head (not shown) arranged in the interior of the tape guide drum 36 and an electronic circuit for reproduction (not shown), then undergo a predetermined signal processing and then is applied to a display device (not shown) where the recorded images are reproduced. That is, the apparatus assumes the reproducing position. In this position, the actuating area 27b of the clutch changeover plate 27 is taken out of engagement with the actuating projection 8a formed in the lower surface of the loading ring 8, and the clutch changeover plate 27 is held in the position illustrated in FIG. 3 under the action of a bias spring (not shown). As a result, the clutch disc 23 is held in the position where its extensions 23b and 23b' do not engage the projections 26a formed in the intermediate ring 26. For this reason, the driving torque of the motor 18 is transmitted through the drive pulley 24, slip member 25 and intermediate ring 26 to the idler 14.

During reproduction, when the fast forward button 30a or the fast rewind button 31a is depressed, the idler 14 engages either the takeup reel table 13, or the supply reel table 12, and at the same time the slide plate 32 is moved to the left as viewed in FIG. 1, causing the actuating lever 33 to turn in the clockwise direction which in turn causes the takeup idler 28 to move away from the takeup reel table 13. Along therewith, the switch 103 or switch 104 is turned on to produce the output P3 or P4 of high level. Responsive to this, the OR circuit 56 changes its output from low to high level. Since, at this time, the aforesaid switches 100 and 102 have their outputs P0 and P2 both of high level, the inputs of the AND circuit 53 are all of high level, and the output P5 of the AND circuit 53 becomes high. As a result, the control signal of high level is applied to the speed control circuit 521, thereby the capstan motor 18 is speeded up to the second number of revolutions N2 for the capstan 6 running the tape 39 at the speed for the search mode. In this case, the direction of rotation of the capstan motor 18, as the fast rewind button 31a is pushed to turn on the switch 104, is reversed by the drive control circuit 522. Otherwise, it is driven in the forward direction. Thereupon, the tape 39 is impelled by the pinch roller 5 and capstan 6 to run at the increased speed above the ordinary reproducing tape speed in the forward or reversed direction. At this time, as has been described above, the one of the reel tables which takes up the tape, namely when in the fast forward, the takeup reel table 13, or when in the fast rewind, the supply reel table 12 engages the idler 14, and is rotated by the idler 14. In this connection, it should be pointed out that the idler 14 because of its cooperation with the slip member 25 in the transfer of the drive torque of the capstan motor 18 therethrough enables the reel to wind the tape which is being fed smoothly at far faster a speed than the ordinary reproducing speed thanks to the properly adjusted torque.

To stop the apparatus from reproducing, the STOP button 57 is depressed. Such depression of the STOP button 57 causes release of the PLAY button 43 from the locking connection by a lock release mechanism (not shown) so the switch 102 is turned off to change its output P2 from high to low level. As a result, the control signal appearing at the control terminal 44a of the drive control circuit 44 for the loading motor 9 changes from low to high. Since, at this time, the output P2 of the aforesaid switch 102 is of low level, the control signal appearing at the control terminal 44b is of low level. As a result, the drive control circuit 44 produces a current flow through the motor 9 in the direction indicated by arrow E. In this case, the direction of current flow to the motor 9 is opposite to that during loading, that is, the F direction, so that the motor 9 is driven in the direction opposite to that when loading. Therefore, the loading rings 7 and 8 start to turn in directions opposite to those during loading. Also in synchronism with the start of movement of the loading rings 7 and 8, a control means (not shown) moves the pinch roller 5 away from the capstan 6. In connection with this movement of the pinch roller 5, the takeup idler 28 is also moved away from the takeup reel table 13. At the same time, the loading completion detecting switch 100 is freed from the pressure of the actuating projection 7a of the loading ring 7, and is turned off, thereby its output P0 is changed from high to low level.

As the loading rings 7 and 8 are turning in the unloading direction, the tape pull out members 4 and 3 move in directions opposite to those at the time of loading, thereby permitting the tape 39 to be retracted into the interior of the cassette 2. In this case, the supply reel table 12 winds up the slack loop of the tape 39 as motion of the loading ring 8 is transmitted thereto through an intermediary (not shown). Then when the loading ring 7 reaches the unload completion position, the unload completion detecting switch 101 is actuated by the projection 7b so that its output P1 changes from low to high. As a result, one of the inputs of the NAND circuit 46 becomes low, then the output of the NAND circuit 46 changes from low to high, and then the control signal at the control terminal 44a of the drive control circuit 44 becomes low. Since, at this time, the control signal supplied to the other control terminal 44b is of low level, the aforesaid drive control circuit 44 stops the motor 9 from rotating. That is, rotative movement of the loading rings 7 and 8 is stopped, and the unloading completion position illustrated in FIG. 1 is regained. In this position, as has been described above, the clutch changeover plate 27 is pushed again at the area 27b by the actuating projection 8a of the loading ring 8. It is noted that the tapered surface of the stopper portion 27c formed in the side wall of the actuating area 27b serves to guide the aforesaid actuating projection 8a onto the actuating area 27b smoothly.

As in the above, in this embodiment of the apparatus, the driving torque transfer mechanism for the idler 14 is constructed so that responsive to movement of the loading rings 7 and 8, the first operative position where the driving torque of the motor 18 is transferred directly to the idler 14 is changed over to the second operative position where the driving torque of the motor 18 is transferred through the slip member 25 to the idler 14. This gives rise to an advantage that the driving of the reel table when in the ordinary fast forward, or fast rewind time, and the driving of the takeup side reel table when in the search mode can be selectively performed by the use of the same idler 14. Therefore, the reel table drive mechanism in the search mode-equipped magnetic recording and reproducing apparatus is extremely simplified, and the operating member for the fast forward and fast rewind of the tape within the cassette also can be made to serve as an operating member for the search mode, thus giving an additional advantage that the structure of the control panel is also simplified.

It is noted that in the above-described embodiment of the apparatus the switching of the driving torque transfer mechanism is controlled by the use of the clutch disc 23 in combination with the clutch changeover plate 27 which the latter is arranged to be displaced in response to the movement of the loading ring 8. However, the present invention is not confined thereto. For example, as indicated by a dashed line block in FIG. 3, use may be made of a clutch solenoid as an actuator for the clutch changeover plate 27, and the operation of the clutch solenoid 58 is controlled in accordance with the output of the loading completion detecting switch 100. What is essential is in that the driving torque transfer mechanism of the invention is made switchable between the first and second positions depending upon the loading state of the tape in order to insure that when in the search mode, either one of the reel tables 12 and 13 is driven with a proper winding torque by the idler 14. It is therefore to be understood that the foregoing description of the accompanying drawings are intended to be illustrative of the invention, and are not intended to be limiting since the practical structure may be modified in various ways.

Also, though the above embodiment of the apparatus has been described in connection with the cooperation of the idler 14 with the capstan motor 18 through the driving torque transfer mechanism in such a manner that only in the search mode is the motor 18 caused to rotate in the increased speed, it is preferred that as the idler 14 be made to be driven by the capstan motor 18, not only in the search mode, but also in the ordinary fast forward and fast rewind modes, the motor 18 is further speeded up. According to an embodiment, the driving of the idler 14 is carried out by a motor separate from the capstan motor 18.

As has been explained in greater detail, according to the present invention, it is possible to realize a magnetic recording and reproducing apparatus capable of a search mode with a structure that is very simple as compared with the conventional one. Further, there is no need to increase the number of manual operating members than the ordinary fast forward and fast rewind control members, since one of them can be used as the control member for the search mode. Therefore, the bulk and size and weight of the magnetic recording and reproducing apparatus capable of the search mode can be minimized as compared with the conventional one, and the control panel also can be simplified as compared with the conventional one.

What is claimed is:

1. A reproducing apparatus for reproducing an information signal from a strip-like recording medium, comprising:
   (a) a pair of rotation means for taking up the medium in different directions respectively;
   (b) reproducing means for reproducing the information signal from the medium;
   (c) loading means for loading said reproducing means with the medium, said loading means being movable between a loading and an unloading position;
   (d) generating means for generating driving power;
   (e) moving means for moving the medium between the pair of rotation means, said moving means being able to move the medium at a first speed and a second speed faster than said first speed;
   (f) first transmitting means for selectively transmitting the driving power to each of the rotation means and being able to operate in a first mode for transmitting the driving power to the selected rotation means at a first efficiency with the object of moving the medium at a third speed faster than said second speed and in a second mode for transmitting the driving power to the selected rotation means at a second efficiency lower than said first efficiency;
   (g) first control means for controlling said first transmitting means so that said first transmitting means operates in said second mode when the moving means moves the medium at said second speed;
   (h) second transmitting means for transmitting the driving power to one of the rotation means whose route for transmitting the driving power is different from the route of said first transmitting means; and
   (i) second control means for controlling said second transmitting means so that said first transmitting means is able to operate when the moving means moves the medium at said first speed.

2. An apparatus according to claim 1, wherein said moving means can move the medium at said second speed in either direction.

3. An apparatus according to claim 1, wherein said moving means is arranged to move the medium by utilizing the driving power.

4. An apparatus according to claim 1, wherein said moving means is arranged to respond to said loading means and to move to a position where it can operate the medium between the pair of rotation means.

5. An apparatus according to claim 4, wherein when said loading means is arranged to set the medium in a position where said reproducing means can reproduce the information signal, said moving means being arranged to be able to act on the medium.

6. An apparatus according to claim 4, wherein said first control means is arranged to respond to said loading means and to change said first transmitting means between said first mode and said second mode.

7. An apparatus according to claim 6, wherein said first control means is arranged to set said first transmitting means to said second mode when said loading means is set in a position where the medium can be reproduced by said reproducing means.

8. An apparatus according to claim 6, wherein said first control means is arranged to set said first transmitting means to said second mode when said moving means is able to act on the medium.

9. A reproducing apparatus for reproducing an information signal from a strip-like recording medium, comprising:
   (a) a pair of rotation means for taking up the medium in different directions respectively;
   (b) reproducing means for reproducing the information signal from the medium;

(c) loading means for loading the reproducing means with the medium, said loading means being movable between a loading and an unloading position;

(d) generating means for generating driving power;

(e) a transmitting member for selectively transmitting the driving power to each of the rotation means; and (f) control means for controlling the efficiency of transmitting the driving power from said generating means to said transmitting member in relation to said loading means.

10. An apparatus according to claim 9, wherein said control means includes a friction control member set between said generating means and said transmitting member.

11. An apparatus according to claim 10, wherein said friction control member includes a clutch mechanism and a clutch changeover plate for changing over the engaging state of said clutch mechanism in response to said loading means.

12. An apparatus according to claim 9, wherein said control means operates so as to lower the transmitting efficiency of said transmitting member in relation to the operation of said loading means such that said reproducing means move to a reproducing-possible position relative to the medium.

13. An apparatus according to claim 12, wherein when said loading means is in said unloading position, said control means transmits the power to said transmitting member without loss.

14. A video signal reproducing apparatus using a tape shaped recording medium, comprising:

(a) a pair of rotation means for taking up the medium in different directions respectively;

(b) a head drum assembly having at least one rotating head and guiding the medium by the outer peripheral surface thereof;

(c) loading means causing a path of the medium to change between a first path where the medium is in fitting contact on the outer peripheral surface of said head drum assembly and a second path where the medium is taken out of contact with said head drum assembly;

(d) a motor for generating a rotative driving force for rotating said pair of rotation means;

(e) moving means including a member movable between two positions where the medium can and cannot move respectively and having a first mode for moving the medium at a first speed and a second mode for moving the medium faster at the second speed than at the first speed;

(f) first transmitting control means for controlling the transmitting efficiency of the rotative driving power of said motor to said pair of rotation means;

(g) second transmitting control means for determining whether the transmission of the rotative driving power of said motor to said pair of rotation means is performed by said first transmitting control means, or is cut off;

(h) first manually operable control means cooperating with said loading means and at least a portion of said moving means; and (i) second manually operable control means arranged to permit changing of said moving means between said first mode and said second mode when said moving means is in a position where the medium can be moved, and to operate said second transmitting control means when said moving means is in a position where it cannot move the medium.

15. An apparatus according to claim 14, wherein when said loading means is arranged to form said first path, said moving means lies in the position where it can move the medium.

16. An apparatus according to claim 15, wherein when said loading means forms said first path, said first transmitting control means is arranged to transmit only a portion of the rotative driving power of said motor to said pair of rotation means, and when it forms said second path, all the rotative driving power is transmitted to said pair of rotation means.

17. An apparatus according to claim 14, wherein when said moving means operates in said second mode, said second transmitting control means causes the transmission of the rotative driving power of said motor to said pair of rotation means to be carried out in response to said first transmitting control means.

18. A video signal reproducing apparatus using a tape shaped recording medium comprising:

(a) a pair of rotation means for taking up the medium in different directions respectively;

(b) moving means for operating the medium between the pair of rotation means with the object of moving the medium;

(c) driving means for driving one of the pair of rotation means;

(d) first manually operable control means for changing the apparatus between a first mode where the moving speed of said medium is determined by driving one of said pair of rotation means by said driving means and a second mode where the moving speed of said medium is determined by said moving means; and (e) second manually operable control means for changing the moving speed of the medium by said moving means between a first speed and a second speed which is faster than the first speed, when the apparatus is in said second mode, and further for changing the moving speed of said medium depending upon the rotating of one of said pair of rotation means driven by said driving means between a third speed faster than said second speed and zero when said apparatus is in said first mode.

19. An apparatus according to claim 18, further comprising:

a head drum assembly including at least one rotating head for video signal reproducing and guiding the medium by an outer peripheral surface thereof.

20. An apparatus according to claim 19, further comprising:

loading means for moving the medium between a first path where the medium is in fitting contact on the outer periphery of said drum assembly and a second path where it is out of contact with said drum assembly.

21. An apparatus according to claim 20, wherein when the apparatus is in said first mode, said loading means forms said second path, and when in said second mode, it forms said first path.

22. An apparatus according to claim 18, further comprising:

third manually operable control means for changing the moving speed of the medium by said moving means between said first speed and a fourth speed which is faster than the first speed and reversing the direction of motion of said medium when the apparatus is in said second mode, and for changing the moving speed of the medium depending upon the rotating of one of said pair of rotating means driven by said driving means between zero and a fifth speed faster than said fourth speed in the direction reverse of that for said third speed when the apparatus is in the said first mode.

23. An apparatus according to claim 18, wherein when the apparatus is in said first mode and when the moving speed of the medium is zero, switching of the apparatus to said second mode by said first manually operable control means causes the moving speed of the medium to become the first speed.

24. An apparatus according to claim 23, further comprising:
fourth manually operable control means for resetting said first and second manually operable control means so that the apparatus becomes said first mode and reducing the moving speed of the apparatus to zero.

25. A video signal reproducing apparatus using a tape shaped recording medium, comprising:
(a) a head drum assembly including at least one rotating head for video signal reproduction and guiding the medium by an outer peripheral surface thereof;
(b) loading means for changing the path of the medium between a first path on fitting contact on the outer peripheral surface of said drum assembly and a second path out of contact on said drum assembly;
(c) moving means for moving the medium;
(d) first manually operable means for changing over the apparatus between a first main mode having a first sub-mode and a second sub-mode and a second main mode having a third sub-mode and a fourth sub-mode; and
(e) second manually operable means for changing the apparatus between the first sub-mode and the second sub-mode when the apparatus is in the first main mode and for changing the apparatus between the third sub-mode and the fourth sub-mode when the apparatus is in the second main mode, where
when in said first sub-mode, the medium is on said first path and is moved at a first speed;
when in said second sub-mode, the medium is on said first path, and is moved at faster a second speed than said first speed;
when in said third sub-mode, the medium is on said second path, and the moving speed of the medium is zero; and
when in said fourth sub-mode, the medium is moved at a third speed faster than said second speed.

26. An apparatus according to claim 25, further comprising
third manually operable means for changing the apparatus between said first sub-mode and a fifth sub-mode and between said third sub-mode and a sixth sub-mode, wherein
when in said fifth sub-mode which is included in said first main mode, the medium is on said first path and the medium is moved at a faster fourth speed than said first speed in a direction reverse of that for said second speed; and
when in said sixth sub-mode which is included in said second main mode, the medium is moved a fifth speed faster than said fourth speed in a direction reverse of that for said third speed.

27. An apparatus according to claim 26, further comprising:
fourth manually operable means for resetting all said first to third manually operable means so that the apparatus is in said third sub-mode.

28. An apparatus for reproducing signals from a signal bearing medium, comprising:
(A) reproducing means for reproducing the signals from the medium;
(B) moving means for moving the medium, said moving means being operative for moving the medium at different speeds selectively;
(C) manually operable first means for operating said reproducing means; and
(D) manually operable second means for changing the moving speed of the medium moved by said moving means, said second means being operable regardless of the operation of said first means for changing the moving speed of the medium in conditions where said reproducing means is operative and inoperative.

29. An apparatus for reproducing signals from a signal bearing medium, comprising:
(A) reproducing means for reproducing the signals from the medium;
(B) moving means for moving the medium, said moving means being operative for moving the medium at different speeds selectively; and
(C) manually operable means common to effecting of a fast movement of the medium by said moving means with no signal reproduction by said reproducing means and effecting of a fast movement of the medium by the moving means with signal reproduction by the reproducing means.

30. A tape player for reproducing signals from a signal bearing tape, comprising:
(A) reproducing means for reproducing signals from the tape;
(B) first transporting means operative for transporting the tape at different speeds selectively;
(C) first control means for changing said first transporting means between its operative and its inoperative conditions;
(D) second transporting means operative for transporting the tape at a higher speed higher than the lowest speed of transportation of the tape effected by said first transporting means; and
(E) second control means common to said first and second transporting means, said second control means operating only the second transporting means when the first transporting means is set at its inoperative condition by said first control means, and operating the second transporting means and causing the first transporting means to transport the tape at a higher speed when the first transporting means is set at its operative condition by the first control means.

31. A video tape player for reproducing video signals from a video signal bearing tape contained in a cassette, said cassette having a pair of reels for winding the tape, said player comprising:
(A) reproducing means for reproducing the video signals from the tape;

(B) movable means movable for loading the tape on said reproducing means and for unloading the tape from the reproducing means;
(C) first transporting means operative for transporting the tape at different speeds selectively in a condition that the tape is loaded on said reproducing means by said movable means, said first transporting means including a capstan and a pinchroller;
(D) second transporting means operative for transporting the tape at a higher speed higher than the lowest speed of transportation of the tape effected by said first transporting means, said second transporting means including reel driving means for driving one of the reel in the cassette; and
(E) control means common to said first and second transporting means, said control means operating only the second transporting means in a condition in which the tape is unloaded from said reproducing means by said movable means, and operating the second transporting means and causing said first transporting means to transport the tape at a higher speed in a condition in which the tape is loaded on the reproducing means by the movable means.

* * * * *